United States Patent [19]
Bohn

[11] Patent Number: 4,864,766
[45] Date of Patent: Sep. 12, 1989

[54] WEEDLESS JIG

[76] Inventor: Greg Bohn, 6087 Hwy. 51 South, Hazelhurst, Wis. 54531

[21] Appl. No.: 316,324

[22] Filed: Feb. 27, 1989

Related U.S. Application Data

[63] Continuation-in-part of Ser. No. 190,683, May 5, 1988, abandoned.

[51] Int. Cl.$^4$ .................. A01K 83/00; A01K 85/00
[52] U.S. Cl. .................. 43/42.37; 43/42.39; 43/42.43; 43/42.53; 43/43.6
[58] Field of Search .................. 543/42.37, 42.39, 42.4, 543/42.43, 42.53, 43.6

[56] References Cited

U.S. PATENT DOCUMENTS

| | | | |
|---|---|---|---|
| 983,353 | 2/1911 | Doddridge | 43/43.4 |
| 2,199,001 | 4/1940 | Khoenle | 43/42.37 |
| 2,449,700 | 9/1948 | Hubbard | 43/42.4 |
| 2,615,277 | 10/1952 | Hayden | 43/43.2 |
| 2,663,111 | 12/1953 | Hollingsworth | 43/42.4 |
| 2,789,287 | 4/1957 | Plummer, Jr. | 43/43.6 |
| 3,191,336 | 6/1965 | Cordell, Jr. | 43/42.37 |
| 3,221,437 | 12/1965 | DeLong | 43/43.4 |
| 3,750,321 | 8/1973 | McClellan | 43/42.1 |
| 3,750,323 | 8/1973 | Weis | 43/42.28 |
| 3,807,079 | 4/1974 | Goforth | 43/42.17 |
| 4,516,352 | 5/1985 | Firmin | 43/42.26 |
| 4,662,100 | 5/1987 | Yarusso | 43/42.37 |

OTHER PUBLICATIONS

The In Fisherman; #74 Aug/Sep.; "A Brush with WalIEyes" by Joe Bucher; pp. 58–64.
The Sporting Goods Dealer; Feb. 1964; Advertisement for Eagle Claw Weedmaster Weedless Fish Hooks (Adjacent to p. 134)..
Do-It Molds; catalog #88,1987; pp. 11–13.

Primary Examiner—Richard K. Seidel
Assistant Examiner—William Scott Andes
Attorney, Agent, or Firm—Russell L. Johnson

[57] ABSTRACT

A weedless jig having a bundle of individual fine stainless steel wires molded into the head of the jig to form a weed deflector. The wires are separable from each other to form an array of deflectors of the user's preference. The bundle of individual stainless steel wires is flexible and is mechanically interlocked in the jig head by a novel molding method.

8 Claims, 2 Drawing Sheets

WEEDLESS JIG

This is a continuation-in-part of application Ser. No. 190,683, filed 05/05/88, now abandoned.

FIELD OF THE INVENTION

This invention relates to weedless jigs and a method for making them.

More particularly this invention relates to jigs having multiple strand stainless steel weed deflectors molded into the head of the jig.

BACKGROUND OF THE INVENTION

Fishing jigs are fishing lures characterized by having a fish hook with its shank bent near the eye and having a mass formed around the bend to create a jig head.

Hooks are commonly rendered weedless by providing the hook with reed like deflectors that originate from the shank of the hook near the eye and extend to near the point of the hook. An effective deflector for rendering a hook weedless is one that is stiff enough to deflect the jig so that it will not engage an obstruction such as a weed or snag, but wherein the deflector does not interfere with the setting of the hook in a fish's mouth.

DISCUSSION OF THE PRIOR ART

The prior art abounds with means for rendering hooks weedless. The prior art does not provide a multiple strand deflector for rendering jigs weedless wherein the deflector comprises a multiplicity of individual strands of stainless steel wire molded as a bundle into the head of the jig.

The prior art teaches away from using stranded wire inserts for molding with lead, solder, and other high density, low melting point metals and other flowable materials due to the ease with which the flowable materials will flow between the strands of wire and cause them to be fused together upon cooling.

BRIEF DESCRIPTION OF THE INVENTION

The invention in its simplest form is a jig with a length of multiple strand stainless steel wire molded into the head of the jig so as to form a multiple strand weed deflector for the barb portion of the jig hook and a method for making the jig wherein the multiple strand wire is sufficiently tightly and precisely twisted and consistent in cross sectional diameter that a length of the wire can be clamped as a mold insert into a jig mold and sealed therein so that the molding material will not flow into the external strands of the wire and thereby permits the ready separation of the individual strands of the wire after the assembled weedless jig is removed from the mold.

DETAILED DESCRIPTION OF THE INVENTION

Figure 1:
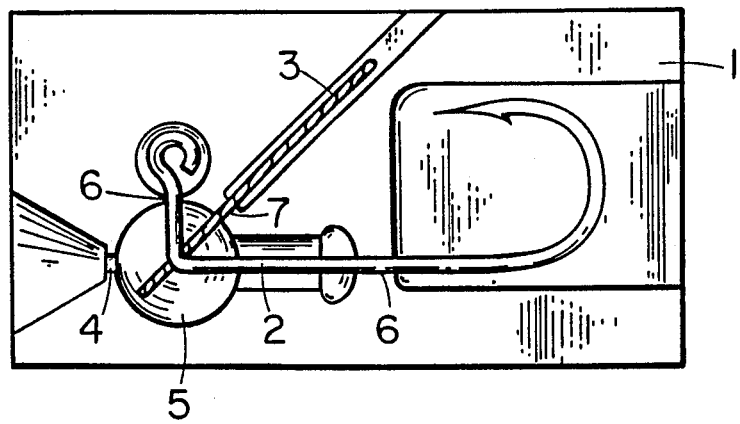
FIG. 1 is a plan view of one half of a jig mold of this invention having the mold inserts in place.

In the drawings, like numbers refer to like objects.

Referring now to FIG. 1. Jig mold 1 has receivers for holding jig hook 2 and length of multiple stranded stainless steel wire 3. Jig mold 1 is provided with a conventional in-gate 4 for admitting flowable material into mold cavity 5. Hook 2 is sealed in place at hook seals 6 which are in the form of precisely machined hook receivers that create a seal against the flow of molding material along the hook shaft when the mold is closed.

In a like manner, wire 3 is sealed at wire seal 7.

Stranded wire 3 is of a small diameter and is flexible. When mold 1 is closed, wire 3 is bent slightly due to contact between wire 3 and the shaft of hook 2. This bend contributes to the mechanical interlocking of the twisted strands of wire 3 after the molding material is hardened to form jig head 9.

Stranded wire 3 is a multiple strand stainless steel wire as for example; a seven stranded stainless steel wire sold under the name of Surfstrand (TM) by the American Fishing Wire Co. with a diameter of 0.018 inches and with individual strands having a diameter in the order of 0.008 inches.

The above example is representative of the wire used for a 1/16 ounce jig. It should be understood that larger or smaller diameter wires will be suitable for larger or smaller weight jigs. Stranded wire between 0.012 inches in diameter and 0.024 inches in diameter is useful in practicing this invention.

The use of stainless steel wire provides a suitable degree of stiffness to the small diameter individual strands 8. The small diameter precisely twisted individual strands 8 are tightly and mechanically interlocked with each other so that when the molding material of jig head 9 solidifies around the bundle of individual strands they are tightly and securely engaged with each other and securely held in place in head 9.

Figure 3:
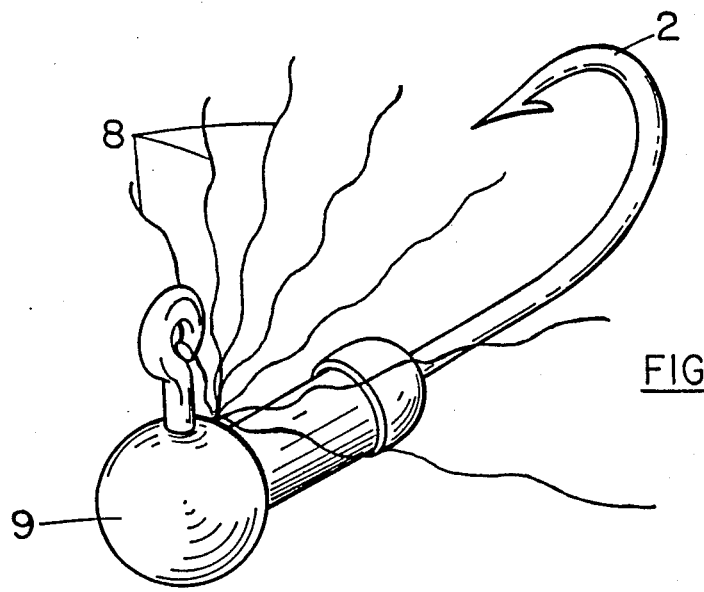
FIG. 3 is a pictorial view of the jig of FIG. 2 wherein the multiple strands of the deflector are separated from each other.
Figure 2:
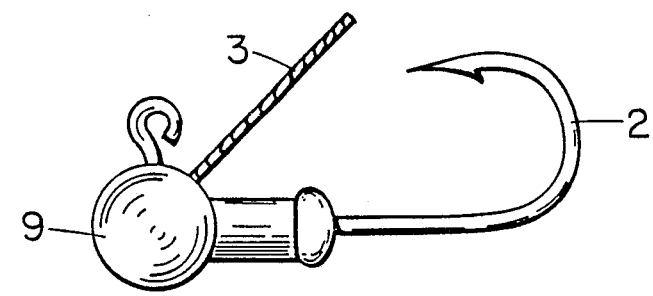
FIG. 2 is an elevational view of a finished jig formed in the mold of FIG. 1.

In use the individual strands 8 of wire 3 may be separated to form an arrangement of multiple deflectors ranging from the single deflector of FIG. 2 to the array of single strands 8 of FIG. 3. It should be understood that it is a novel utility of this invention to provide a means for permitting the user of a jig to form the weed guard into a configuration that is suited to the prevailing fishing conditions or of the users preferences.

The individual strands 8 may be bent to a location of the users preference. The small diameter single strands 8 are all but invisible in the water and the helical shape given the strand by twisting renders the strands reflective. Both of these attributes are highly desirable in guards for hooks for jigs.

The spread configuration of the individual strands shown in FIG. 3 serves to hold the hook in the upright position when the jig is resting on a surface out of the water and thereby reduces the tendency of the hook to become engaged with things on land.

Conventional jigs have their heads formed of dense, low melting temperature metals such as lead, solder, babbitt, and the like. It has been found that the weedless jig of this invention, when provided with a jig head of lesser density exhibits novel and useful attributes.

For example; a weedless jig having a molded head of plastics having a density near that of water, (polyethylene, polypropylene, etc.) in the range between 0.85 and 0.97, will, in combination with the hook and the weed guard, form a weedless jig with an overall density slightly greater than 1.0.

Such a jig will sink slowly in water and be deflected easily under water. This property will permit the slow retrieve of the jig through brush and tree tops where a more dense jig would sink rapidly into the brush pile and make a slow retrieve of the jig more difficult and less natural appearing to a fish.

As another example; the jig head may be formed of a very low density plastic such as expanded polystyrene or a foamed plastic, to form a floating weedless jig with a density of considerably less than 1.0, and in the preferred embodiments, having a density less than 0.6.

The jig of the first example may be formed by the means shown in FIG. 1 or by injection molding methods. The jig head may be given the shape shown or it may be given one of the large number of shapes commonly given to jig heads.

The jig of the second example may be formed by the means of FIG. 1 wherein the jig head is given a greater proportional volume so as to render the jig buoyant. Alternatively, the jig of the second example may be formed by pouring expandable beads, or foaming mixtures into the mold cavity 5 and then causing them to expand by heating the mold.

Figure 4:
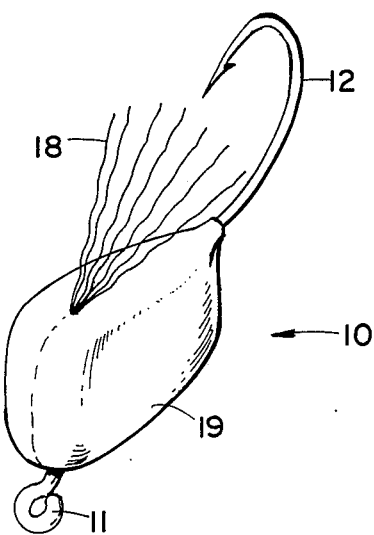
FIG. 4 is a pictorial view of weedless jig having a density less than 0.6.
Figure 5:
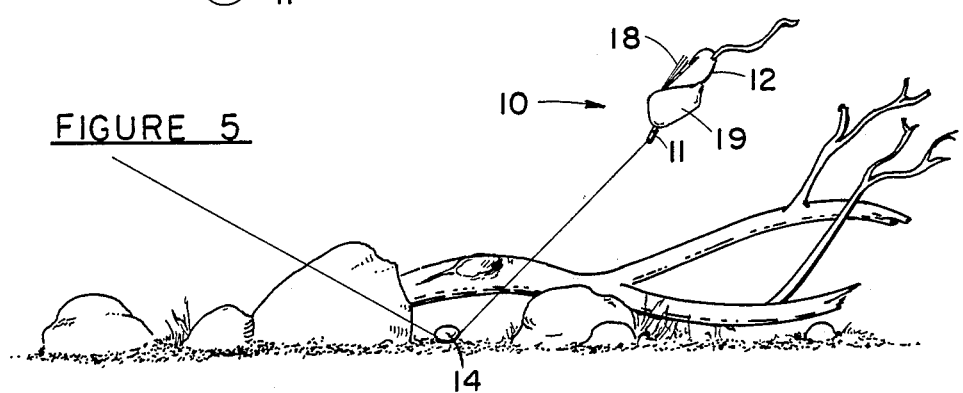
FIG. 5 is a pictorial view showing the jig of FIG. 4 in use.

Referring now to FIGS. 4 and 5, weedless floating jig 10 is illustrated. Jig 10 has hook eye 11 positioned on the opposite side of body 19 from the positioning of strands 18 and hook 12. This configuration floats weedless jig 10 above sinker 14 with hook 12 and guard strands 18 in the conventional upright position for fishing among rocks, snags and tall weeds as illustrated in FIG. 5.

Figure 6:
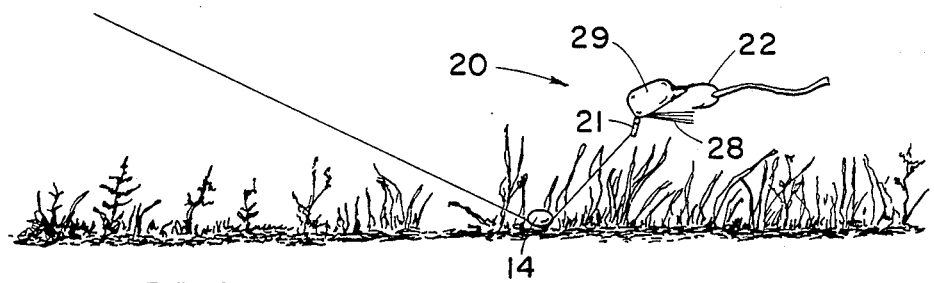
FIG. 6 is a pictorial view showing a second embodiment of the jig of FIG. 4 in use.

Referring now to FIG. 6, weedless jig 20 is shown. Eye 21 is shown to be on the same side of body 29 as hook 22 and guard strands 28. It will be noted that when jig 20 is floated above sinker 14, it floats with the barb of hook 22 in a position that is inverted relative to the conventional attitude of jig hooks. This feature of weedless floating jig 20 is particularly advantageous in setting hook 22 into the lower jaw of bottom feeding fish when fishing soft or muddy bottoms and/or low weeds.

The above descriptions provide an enabling disclosure and recite the preferred embodiments and the best mode of practicing the invention known to the inventor at the time of the filing of this application.

However, it should be understood that the invention should not be limited to the disclosed embodiments but that the invention should be limited only by the appended claims and all equivalents thereto that would become apparent to one skilled in the art.

I claim:
1. A jig type fishing lure comprising;
   (1) a hook having a shank, a barb and an eye,
   (2) a molded metal jig head formed around the shank near the eye,
   (3) a twisted bundle of individual strands of stainless steel wires twisted about each other to form a stranded wire anchored at one end in the jig head and having the opposite end located near the barb of the hook so that the individual strands are separable into an array of deflectors for rendering the hook weedless.

2. A jig type fishing lure comprising;
   (1) a hook having a shank, a barb and an eye,
   (2) a molded metal jig head formed around the shank near the eye,
   (3) a bundle of individual strands of stainless steel wires anchored at one end in the jig head and having the opposite end located near the barb of the hook so that the individual strands are formable into an array of deflectors for rendering the hook weedless, and wherein the bundle of individual strands is in the form of a length of stranded stainless steel wire having at least four individual strands of wire twisted about each other to form the stranded wire, and the wire being molded in place in the head of the jig and the individual strands being separable after the molding process is complete.

3. A jig type fishing lure comprising;
   (1) a hook having a shank, a barb and an eye,
   (2) a molded metal jig head formed around the shank near the eye,
   (3) a bundle of individual strands of stainless seel wires anchored at one end in the jig head and having the opposite end located near the barb of the hook so that the individual strands are formable into an array of deflectors for rendering the hook weedless, and wherein the bundle of individual strands is in the form of a length of stranded stainless steel wire having at least four individual strands of wire twisted about each other to form the stranded wire, and the wire being molded in place in the head of the jig and the individual strands being separable after the molding process is complete, and wherein the bundle of individual strands is in the form of a short length of seven strand stainless steel wire having a diameter between 0.012 inches and 0.024 inches.

4. A jig type fishing lure comprising;
   (1) a hook having a shank, a barb and an eye,
   (2) a molded jig head formed around the shank near the eye,
   (3) a twisted bundle of individual strands of stainless steel wires twisted about each other to form a stranded wire anchored at one end in the jig head and having the opposite end located near the barb of the hook so that the individual strands are separable into an array of deflectors for rendering the hook weedless.

5. The lure of claim 4 wherein the molded jig head is formed of a plastic material having a density of less than 1.0.

6. The lure of claim 4 wherein the plastic material has a density sufficiently close to 1.0 that the combined hook, jig head and twisted bundle of stainless steel wires has a density greater than 1.0.

7. The lure of claim 4 wherein the plastic material has a density sufficiently less than 1.0 so that the combined hook, jig head, and twisted bundle of stainless steel wires has a density of less than 1.0.

8. The lure of claim 7 wherein the combined hook, jig head, and bundle of stainless steel wires has a density of less than 0.6.

* * * * *